(12) United States Patent
Bhagwan et al.

(10) Patent No.: US 11,977,606 B2
(45) Date of Patent: May 7, 2024

(54) PATTERN BASE CONFIGURATION VERIFIER

(71) Applicant: Microsoft Technology Licensing, LLC, Redmond, WA (US)

(72) Inventors: Ranjita Bhagwan, Bangalore (IN); Sonu Mehta, Bangalore (IN); Arjun Radhakrishna, Seattle, WA (US); Sahil Garg, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/607,621

(22) PCT Filed: Aug. 31, 2021

(86) PCT No.: PCT/US2021/048309
§ 371 (c)(1),
(2) Date: Oct. 29, 2021

(87) PCT Pub. No.: WO2022/093385
PCT Pub. Date: May 5, 2022

(65) Prior Publication Data
US 2023/0267178 A1    Aug. 24, 2023

(30) Foreign Application Priority Data
Oct. 30, 2020  (IN) .............................. 202041047566

(51) Int. Cl.
*G06F 16/35*  (2019.01)
*G06F 16/2455*  (2019.01)
*G06F 18/2323*  (2023.01)

(52) U.S. Cl.
CPC .... *G06F 18/2323* (2023.01); *G06F 16/24564* (2019.01); *G06F 16/24565* (2019.01); *G06F 16/35* (2019.01)

(58) Field of Classification Search
None
See application file for complete search history.

(56) References Cited

U.S. PATENT DOCUMENTS

| | | | | |
|---|---|---|---|---|
| 9,313,230 B1* | 4/2016 | Kruse | ................... | G06F 11/004 |
| 2009/0276506 A1* | 11/2009 | Tiwari | .................. | G06F 40/186 |
| | | | | 715/234 |
| 2016/0373293 A1* | 12/2016 | Kushmerick | ......... | H04L 41/069 |

OTHER PUBLICATIONS

Bhagwan, et al., "Learning Patterns in Configuration", Retrieved from: https://www.microsoft.com/en-us/research/uploads/prod/2021/09/ConfigRule_ASE.pdf, Sep. 2021, 12 Pages.

(Continued)

*Primary Examiner* — Kannan Shanmugasundaram
(74) *Attorney, Agent, or Firm* — Schwegman Lundberg & Woessner, P.A.

(57) ABSTRACT

A computer implemented method includes obtaining multiple configuration files that include configuration commit histories, detecting patterns in parameter values in the configuration files to generate file-based rules for configuration parameters, detecting patterns in parameter values in the (Continued)

configuration files to generate history-based rules using commit histories for the configuration parameters, and exposing the rules to calling programs.

13 Claims, 7 Drawing Sheets

(56) References Cited

OTHER PUBLICATIONS

"Access Issue: May and Jun. 2019", Retrieved from: https://status.salesforce.com/incidents/3822, Retrieved Date: Oct. 6, 2020, 05 Pages.
"Access Misconfiguration for Customer Support Database", Retrieved from: https://msrc-blog.microsoft.com/2020/01/22/access-misconfiguration-for-customer-support-database/, Jan. 22, 2020, 03 Pages.
"Ansible", Retrieved from: https://www.ansible.com/, Retrieved Date: Oct. 6, 2020, 04 Pages.
"Azure DevOps", Retrieved from: https://web.archive.org/web/20190504093014/https://azure.microsoft.com/en-in/services/devops/, Retrieved Date: May 4, 2019, 13 Pages.
"ConfigCop", Retrieved from: https://github.com/fivegoodfriends/ConfigCop, Retrieved Date: Oct. 6, 2020, 03 Pages.
"Content Assist Preferences", Retrieved from: https://www.eclipse.org/pdt/help/html/code_assist.htm, Retrieved Date: Oct. 6, 2020, 02 Pages.
"Git", Retrieved from: https://git-scm.com/, Retrieved Date: Oct. 6, 2020, 02 Pages.
"GitHub Inc", Retrieved from: https://web.archive.org/web/20190424012616/https://github.com/, Retrieved Date: Apr. 24, 2019, 08 Pages.
"Google app engine app.yaml reference", Retrieved from: https://cloud.google.com/appengine/docs/standard/python/config/appref, Retrieved Date: Oct. 6, 2020, 22 Pages.
"Google Cloud Networking Incident 19009", Retrieved from: https://status.cloud.google.com/incident/cloud-networking/19009, Retrieved Date: Oct. 6, 2020, 10 Pages.
"Intellisense in Visual Studio Code", Retrieved from: https://web.archive.org/web/20190424135319/https://code.visualstudio.com/docs/editor/intellisense, Apr. 24, 2019, 09 Pages.
"Microsoft Program Synthesis using Examples (PROSE)", Retrieved from: https://www.microsoft.com/en-us/research/ group/prose/, Retrieved Date: Oct. 6, 2020, 04 Pages.
"Puppet", Retrieved from: https://web.archive.org/web/20200828022057/https://puppet.com/, Retrieved Date: Aug. 28, 2020, 07 Pages.
"StyleCop Analyzers for the .NET Compiler Platform", Retrieved from: https://github.com/DotNetAnalyzers/StyleCopAnalyzers, Retrieved Date: Oct. 6, 2020, 04 Pages.
"The State of Cloud Security 2020", In Whitepaper of Sophos, Jul. 2020, 16 Pages.
"XMLDiffPatch", Retrieved from https://www.nuget.org/packages/XMLDiffPatch/, Retrieved Date: Oct. 6, 2020, 3 Pages.
Abedjan, et al., "Profiling Relational Data: A Survey", In VLDB Journal, vol. 24, Issue 4, Jun. 2, 2015, pp. 557-581.
Cormode, et al., "Synopses for Massive Data: Samples, Histograms, Wavelets, Sketches", In Journal of Foundations and Trends in Databases, vol. 4, No. 1-3, Jan. 2012, 294 Pages.
George, et al., "Overview of Azure Cloud Services", Retrieved from: https://docs.microsoft.com/en-us/azure/cloud-services/cloud-services-choose-me, Apr. 19, 2017, 03 Pages.
Gulwani, Sumit, "Automating String Processing in Spreadsheets Using Input-Output Examples", In Proceedings of the 38th Annual ACM SIGPLAN-SIGACT Symposium on Principles of Programming Languages, Jan. 26, 2011, pp. 317-330.
Haas, et al., "Sampling-Based Estimation of the Number of Distinct Values of an Attribute", In Proceedings of the 21st International Conference on Very Large Data Bases, Sep. 11, 1995, pp. 311-322.

Heise, et al., "Scalable Discovery of Unique Column Combinations", In Proceedings of the VLDB Endowment, Dec. 2013, pp. 301-312.
Huang, et al., "Confvalley: A Systematic Configuration Validation Framework for Cloud Services", In Proceedings of the Tenth European Conference on Computer Systems, Apr. 21, 2015, 16 Pages.
Ioannidis, Yannis, "The History of Histograms (abridged)", In Proceedings of the 29th International Conference on Very Large Data Bases, Jan. 2003, 12 Pages.
Iyer, et al., "Synthesis and Machine Learning for Heterogeneous Extraction", In Proceedings of the 40th ACM SIGPLAN Conference on Programming Language Design and Implementation, Jun. 22, 2019, pp. 301-315.
Karras, et al., "The Haar+ Tree: A Refined Synopsis Data Structure", In Proceedings of IEEE 23rd International Conference on Data Engineering, Apr. 15, 2007, 10 Pages.
Le, et al., "FlashExtract: A Framework for Data Extraction by Examples", In Proceedings of the 35th ACM SIGPLAN Conference on Programming Language Design and Implementation, Jun. 9, 2014, pp. 542-553.
Martins, et al., "Trinity: An Extensible Synthesis Framework for Data Science", In Proceedings of the VLDB Endowment, vol. 12, Issue 12, Aug. 2019, pp. 1914-1917.
Mehta, et al., "Rex: Preventing Bugs and Misconfiguration in Large Services Using Correlated Change Analysis", In Proceedings of the 17th USENIX Symposium on Networked Systems Design and Implementation (NSDI '20), Feb. 25, 2020, pp. 435-448.
Moolchandani, Om, "Cloud Waterhole—A Novel Cloud Attack observed on Twillo", Retrieved from: https://www.linkedin.com/pulse/cloud-waterhole-novel-attack-observed-twilio-om-moolchandani/, Jul. 22, 2020, 04 Pages.
Padhi, et al., "FlashProfile: A Framework for Synthesizing Data Profiles", In Proceedings of the ACM on Programming Languages, No. 2, Oct. 24, 2018, 28 Pages.
Papenbrock, et al., "Functional Dependency Discovery: An Experimental Evaluation of Seven Algorithms", In Proceedings of the VLDB Endowment, vol. 8, Issue 10, Jun. 2015, pp. 1082-1093.
Rabkin, Ariels. , "The conf_spellchecker tool", Retrieved from: https://github.com/roterdam/jchord/tree/master/conf_spellchecker, Retrieved Date: Oct. 6, 2020, 02 Pages.
Rabkin, Ariels. , "Using Program Analysis to Reduce Misconfiguration in Open Source Systems Software", In Dissertation Submitted in Partial Satisfaction of the Requirements for the Degree of Doctor of Philosophy in Computer Science, 2012, 122 Pages.
Raza, et al., "Automated Data Extraction Using Predictive Program Synthesis", In Proceedings of the Thirty-First AAAI Conference on Artificial Intelligence, Feb. 4, 2017, pp. 882-890.
Raza, et al., "Web Data Extraction using Hybrid Program Synthesis: A Combination of Top-down and Bottom-up Inference", In Proceedings of the ACM SIGMOD International Conference on Management of Data, Jun. 14, 2020, pp. 1967-1978.
Santolucito, et al., "Probabilistic Automated Language Learning for Configuration Files", In Proceedings of International Conference on Computer Aided Verification, Jul. 16, 2017, pp. 80-87.
Scott, et al., "Getafix: Learning to Fix Bugs Automatically", In Proceedings of the ACM on Programming Languages, Oct. 2019, 27 Pages.
Sherman, et al., "ACMS: The Akamal Configuration Management System", In Proceedings of the 2nd Conference on Symposium on Networked Systems Design and Implementation, May 2, 2005, pp. 245-258.
Shinde, Sagar, "How to Validate XML Using XSD in C#", Retrieved from: https://www.c-sharpcorner.com/article/how-to-validate-XML-using-xsd-in-c-sharp/, Nov. 28, 2018, 09 Pages.
Singh, Rishabh, "BlinkFill: Semi-supervised Programming by Example for Syntactic String Transformations", In Proceedings of the VLDB Endowment, vol. 9 , Issue 10, Jun. 2016, pp. 816-827.
Tang, et al., "Holistic Configuration Management at Facebook", In Proceedings of the 25th Symposium on Operating Systems Principles, Oct. 4, 2015, pp. 328-343.

(56) References Cited

OTHER PUBLICATIONS

Xu, et al., "Early Detection of Configuration Errors to Reduce Failure Damage", In Proceedings of the 12th USENIX Conference on Operating Systems Design and Implementation, Nov. 2, 2016, pp. 619-634.

Yuan, et al., "Context-Based Online Configuration-Error Detection", In Proceedings of the USENIX Conference on USENIX Annual Technical Conference, Jun. 15, 2011, 14 Pages.

Zhang, et al., "A Statistical Perspective on Discovering Functional Dependencies in Noisy Data", In Proceedings of the ACM SIGMOD International Conference on Management of Data, Jun. 14, 2020, pp. 861-876.

Gall, et al., "Detection of Logical Coupling Based on Product Release History", In Proceedings of the International Conference on Software Maintenance, Nov. 20, 1998, 10 Pages.

Kakarla, et al., "Finding Network Misconfigurations by Automatic Template Inference", In Proceedings of the 17th USENIX Symposium on Networked Systems Design and Implementation, Feb. 25, 2020, pp. 999-1013.

Laptev, et al., "Optimizing Regular Expression Clustering for Massive Pattern Search", In Technical report of UCLA, 2012, 13 Pages.

"International Search Report and Written Opinion Issued in PCT Application No. PCT/US2021/048309", dated Nov. 24, 2021, 14 Pages.

Zimmermann, et al., "Mining Version Histories to Guide Software Changes", In Proceedings of the 26th International Conference on Software Engineering, May 23, 2004, 10 Pages.

\* cited by examiner

```
                                                          ⟋—100
        APPLICATION CONFIG FILE
        APPLICATION: FOOBAR
      ⟋— VERSION: 5
 120    RUNTIME: PHP55

#MANIFEST FILES
      ⟋— URL: /(.+ '(APPCACHE))
 130    STATIC_FILES:\1
        UPLOAD: STATIC/(.+ '(APPCACHE))
 150—   MIME_TYPE: TEXT/CACHE-MANIFEST
 110—   EXPIRATION: "0S"—112
 135—  -URL: /(.+ 'WEBAPP)
        STATIC_FILES:\1
        UPLOAD:/(.+ 'WEBAPP)
 155—   MIME_TYPE: APP/X-WEB-APP-MANIFEST+JSON
 110—   EXPIRATION:"5S"—114

# CSS, JAVASCRIPT, TEXT ETC
 140—  - URL:/(.+ '(CSS|JS|XML|TXT))
        STATIC_FILES:\1
        UPLOAD: /(.+ '(CSS|JS|XML|TXT))
 110—   EXPIRATION: "5M"
                            116
       # HTML PAGES
 145—  -URL:/(.+ 'HTML)
        STATIC_FILES: \1
        UPLOAD: (.+ 'HTML)
 110—   EXPIRATION: "10M"
                            118
```

| Algorithm: Stochastic string profiling algorithm |
| --- |
| Require: Set of strings $S$ |
| Require: Ranking score Score |
| Ensure: Regular expressions R and outliers $O \subseteq S$ |
|   1: Clusters ← ∅ |
|   2: while * do |
|   3:     $G$ ← Sample($S$, Clusters) |
|   4:     $r$ ← LearnRegex($G$) |
|   5:     Clusters ← Clusters ∪ {→ $r$} |
|   6: end while |
|   7. R ← ApproxExactSetCover(Clusters,Score) |
|   8. $O \leftarrow \{s \in S \mid \forall r \in R.\ s \notin r\}$ |
|   9: return ($R$, $O$) |

| NO. | FILE TYPE | CONFIGNAME | RULE | EXAMPLES | SUPPORT |
|---|---|---|---|---|---|
| 1 | XML | SERVERNAME | SRDC-NLB-0[0-9]Ã | "SRDC-NLB-01A" "SRDC-NLB-03A" | 34 |
| 2 | CONFIG | VERSION | [0-9]+\.[0-9]+\.[0-9]+\.[0-9]+ | "19.12.12.151005" "3.7.25810.101" | 466 |
| 3 | SML | RUNTIME | 00:00:00\.[0-9]7 | "00:00:00.2178760" "00:00:00.3280206" | 7219 |
| 4 | CSPROJ | INCLUDE | tbuild\_DB[0-9a-fA-F]+\.xml | "tbuild_DB3.xml" "tbuild_DB9f.xml" | 17 |
| 5 | XML | DURATION | 00:00:[0-9](2) | "00:00:24" "00:00:01" | 10 |
| 6 | - | TIMESERVERS | 10\.22\.5\.134,10\.89\.0\.13 | - | 1043 |
| 7 | JSON | NORMAL | 0x[0-9a-fA-F](6) | "0x212838" "0x7C68B2" | 33 |
| 8 | JSON | TESTPROFILES | [A-Z][a-z]+,Search,[A-Z][a-z]+ | "Suggestions,Search,Teams" "Recommendations,Search,Suggestions" | 45 |
| 9 | INI | ORDERBY | UserRelation/[a-zA-Z]+[\s]desc | "UserRelation/TrendingWeight desc" "UserRelation/LastAccessTime desc" | 14 |
| 10 | INI | ITEMNAME | AutoSuggest\.[0-9a-zA-Z]+ | "AutoSuggest.IQRankerControlCsgIndex" "Autosuggest.l1v3RankerCsgIndex" | 108 |

PATTERN BASE CONFIGURATION VERIFIER

CROSS-REFERENCE TO RELATED APPLICATION

This application is a U.S. National Stage Filing under 35 U.S.C. 371 of International Patent Application Serial No, PCT/US2021/048309, filed Aug. 31. 2021, and published as WO 2022/093385 on May 5, 2022 , which claims priority to Indian Application No. 202041047566, filed Oct. 30, 2020, which applications and publication are incorporated herein by reference in their entirety.

BACKGROUND

Configuration management is an integral part of the development and deployment of large systems providing services. These services depend heavily on correct configuration to run uninterrupted, be flexible to changing environments, and to scale seamlessly. This ubiquitous use of configuration in services poses several daunting challenges, one of which is to ensure that every configuration parameter is set to a "correct" value. To make matters worse, the amount of configuration that a service needs to manage grows significantly with time as the service scales out and as developers add new features and capabilities. For instance, a popular enterprise service has seen the number of configuration files grow from 3100 to 8200 in just six months.

SUMMARY

A computer implemented method includes obtaining multiple configuration files that include configuration commit histories, detecting patterns in parameter values in the configuration files to generate file-based rules for configuration parameters, detecting patterns in parameter values in the configuration files to generate history-based rules using commit histories for the configuration parameters, and exposing the rules to calling programs.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component." "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture." as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Systems that provide large volumes of services depend on correct configurations to run efficiently and seamlessly. Checking such configurations for correctness has become an important problem because services use a large and continuously increasing number of configuration files and parameters. Very few configuration checking tools exist because the definition of correctness for a configuration parameter is seldom specified or documented. The present inventive subject matter uses configuration pattern mining to learn configuration rules from examples. Using program synthesis and pattern recognition algorithms, file contents and histories of commits are used to learn patterns in configurations.

Unlike code, for which compilers and static analysis tools catch several types of errors even before the developer commits their changes, very few tools exist to perform correctness checks on system configurations. This is because rules governing correctness of a particular system configuration value are very specific to the scenario in which a service uses the configuration value.

For example, a timeout configuration value may capture a timeout for a particular microservice which a microservice expects to be a few minutes. If a developer were to set this timeout value to a few milliseconds by mistake, while the setting would be syntactically correct, the microservice may fail because of a lower-bound check on the timeout value. Even worse, if no such check exists, the microservice would start timing out much too soon in deployment and therefore cause severe service disruption. Such requirements of configuration correctness are seldom documented.

There may be hundreds or more configuration settings for any given system. Very often the configuration settings may be subtle and very specific to the context in which they are used. It can also be difficult to catch invalid configuration settings through specification and hard-coded rule-based checking. As a consequence, misconfiguration in large system services occur much too often and lead to not only build and test failures but also significant service disruption or data breaches. For instance, customer records may be inadvertently exposed due to a database specified PII (personally identifiable information, e.g. email addresses) in an anomalous format.

Modern services maintain configuration in files separate from code, such as in yaml, json or xml files. Developers and engineers currently process configuration changes similar to code changes. Changes to configuration files may be performed through a version control system.

A configuration verification system treats configuration-as-data by tapping into the version control system. Configuration commit logs and file histories provide access to a rich history of configuration file snapshots and changes from which patterns in configuration may be learned. Since configuration is gated by version control systems, configuration checks may be automated at commit time to catch errors early, well before deployment.

Program synthesis, using tools like FlashFill, may be used to learn programs that capture the learned patterns in values, structure and sequences. The configuration verification system utilizes program synthesis and configuration-as-data together to perform efficient configuration pattern mining.

In one embodiment a program synthesis-based string profiling procedure learns rules that capture patterns in configuration values. The profiling procedure is based on the techniques that are efficient and robust to noise. Two types of data may be used by the string profiling algorithm. History-based rules are learned by using previous commits to the same configuration value in a configuration file and detecting patterns in the commits. File-based rules are learned based on patterns of values within the same configuration file. Both rule types are helpful in capturing configuration patterns and are used to flag misconfigurations, autosuggest correct values to developers as they edit configuration, and improve configuration management as a whole.

The configuration verification system performs configuration pattern mining by learning patterns in configuration from examples obtained from file version histories and commit histories. Value-based and structure-based configuration mining are used to learn the patterns.

In one embodiment, a program synthesis string profiling procedure is applied to the configuration examples, treating the configuration examples as data to learn value-based rules pertaining to configuration.

Figure 1:
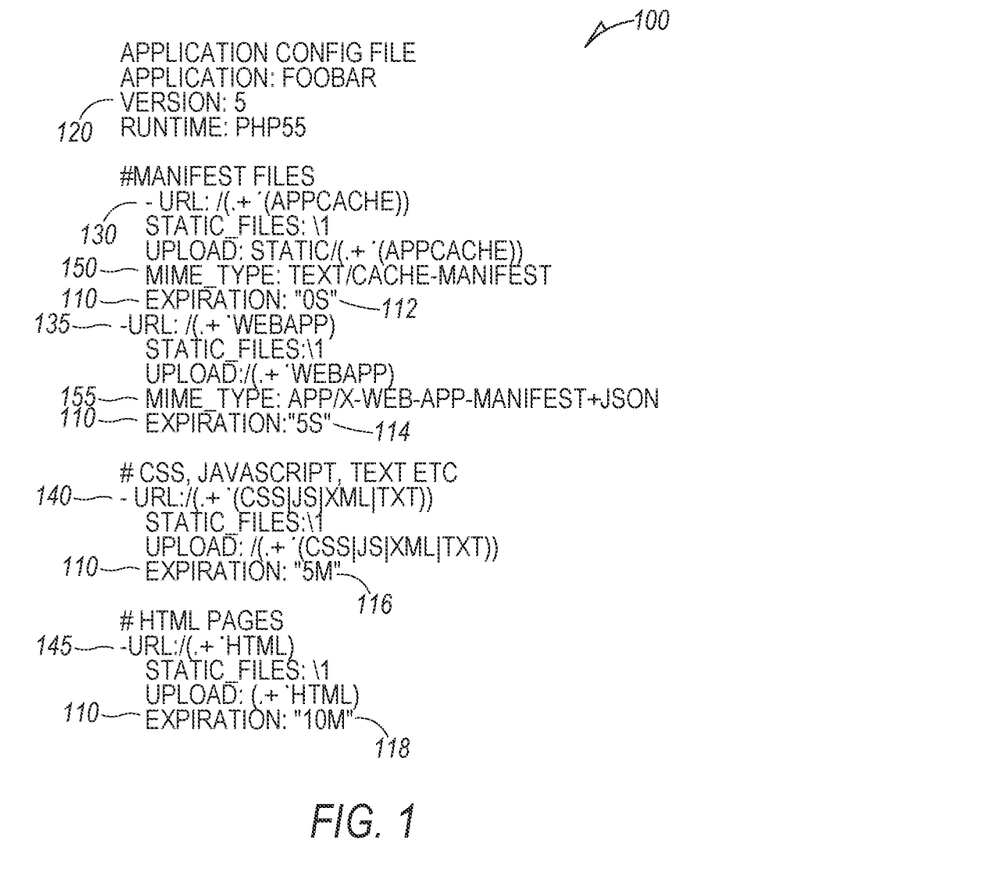
FIG. 1 is an example configuration file according to an example embodiment.

FIG. 1 is an example configuration file 100 according to an example embodiment. A configuration file, be it in json, xml, yaml, or any other format, can be expressed as a hierarchical tree structure. Each node is a key-value pair, where the key is the configuration parameter and the value is the value that the configuration parameter is set to. An edge connecting two nodes captures a parent-child relationship between configuration parameters. Given an expression of a configuration file as such a tree structure, value-based and structure-based pattern mining may be performed.

Value-based pattern mining is the process of learning patterns in the values of configuration parameters. Configuration file 100 is an abridged version of an app engine configuration file. A parameter expiration 110 is set four times 112, 114, 116, and 118 in different sections of the file 100. All values follow a certain pattern: a number followed by an 's' (for seconds) or an 'm' (for minutes). From this, patterns are learned for the value (or a rule) as the regular expression [0-9]+[s|m]. Since this rule is learned based on the contents of the file alone, the rule is referred to as a file-based rule.

A parameter version 120 on the third line is specified only once in the file 100 with a value of 5. Consider that previous values of the parameter 120 were 1, 2, 3 and 4. From all these values, it can be learned that parameter 120 follows the pattern specified as a rule [0-9]+. Such rule is learned from a history of commits to this specific configuration parameter and is referred to as a history-based rule.

Notice that the generalizations these rules provide are not unique. For any given set of values, multiple regular expressions or rules may be learned. For instance, in the case of the expiration parameter 110, a more general expression such as [0-9]+[a-z] may be learned, which allows any letter, not just 's' or 'm'. Or, a more specific regular expression e.g. [0|5|10][s|m] which only allows numbers 0, 5 and 10 may be learned. The selection of which rules to include in a set of rules for any particular system's commit file patterns being learned will be described below.

Structure-Based Pattern Mining.

Configuration files have a rigid structure. In FIG. 1, the file specifies a list of four elements 130, 135, 140, and 145. Each such element is prefixed by a '-'. Each list element has a specified set of configuration parameters. All four elements have parameter expiration 110 specified, whereas, only two out of four elements have mime_type 150, 155 specified. From this structure, it can be inferred that expiration 110 is potentially a mandatory parameter whereas mime_type 150, 155 is not. Another form of structural pattern is that there may be an implicit ordering requirement of parameters. Certain parameters may have to be specified before others. A specific example of this is firewall configuration, where ordering of rules determines whether a connection should be allowed or denied.

Figure 2:
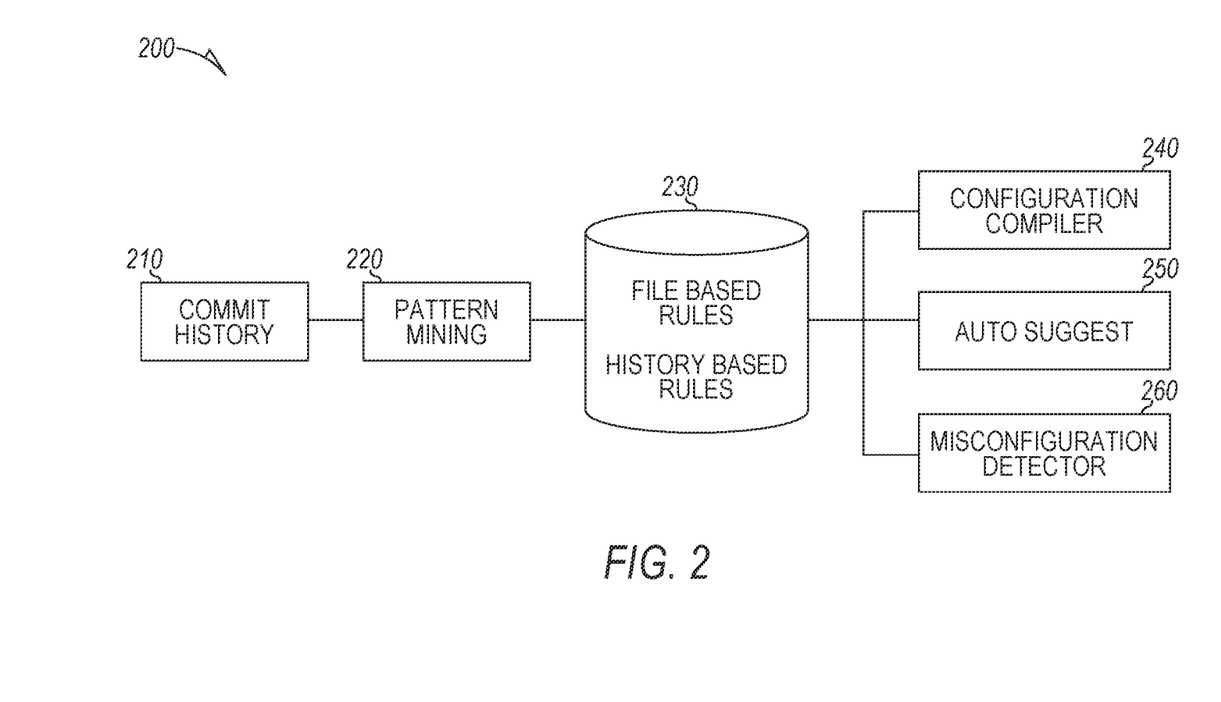
FIG. 2 is a block diagram of a configuration verification system according to an example embodiment.

FIG. 2 is a block diagram of a configuration verification system 200 according to an example embodiment. A commit history 210 stores a series of configuration files that have been committed for a particular type of system executing services. Each configuration file contains the set of parameters that configure the particular type of system and associated services.

A pattern mining routine, algorithm, or tool 220 generates file-based rules of every configuration parameter that has a large enough number of examples within the commit history 210. Next, pattern mining 220 uses the commit histories 210 for a specific configuration parameter to learn history-based rules in a similar manner. All learned rules, their confidence and support are stored in a database 230. Confidence of a rule is a percentage of inputs that match the rule, which support is the number of inputs that match the rule. The rule-learning algorithm runs periodically on file contents and histories. The period may be once per day in some embodiments but may be varied based on the frequency of configurations being modified or generated.

Applications 240, 250, and 260 may access the database 230 through a simple interface which, given a parameter and its value, return all rules that match that value. Applications can use this interface in multiple ways. For instance, an auto-checker or misconfiguration detector 260 can, at review time, post an automated comment if a commit to a particular parameter does not match any of the learned rules. This application is similar to commit recommendation systems. An auto suggestion application 250 can also use the rules to suggest changes to configuration parameters as the developer starts to type in the change. A third application, configuration compiler 240 enables the building of automated configuration compilers and verifiers which can run along with code compilers, perhaps as plugins, to generate warnings, etc.

As referenced above, given a set of example configuration parameters and parameter values, more than one valid regular expression may be learned given a set of inputs. The efficacy of an application using the rules will vary depending upon how specific the rules are. The more specific the rules, the more strict an application will be in enforcing them. The more generic the rules are, the application will be less strict but may miss out on valid misconfigurations. To handle both scenarios, pattern mining 220 learns a combination of rules that are very specific as well as very generic. An application can then use thresholds to use more specific or more general rules depending on the application's tolerance to false-positives and false-negatives.

Figure 3:
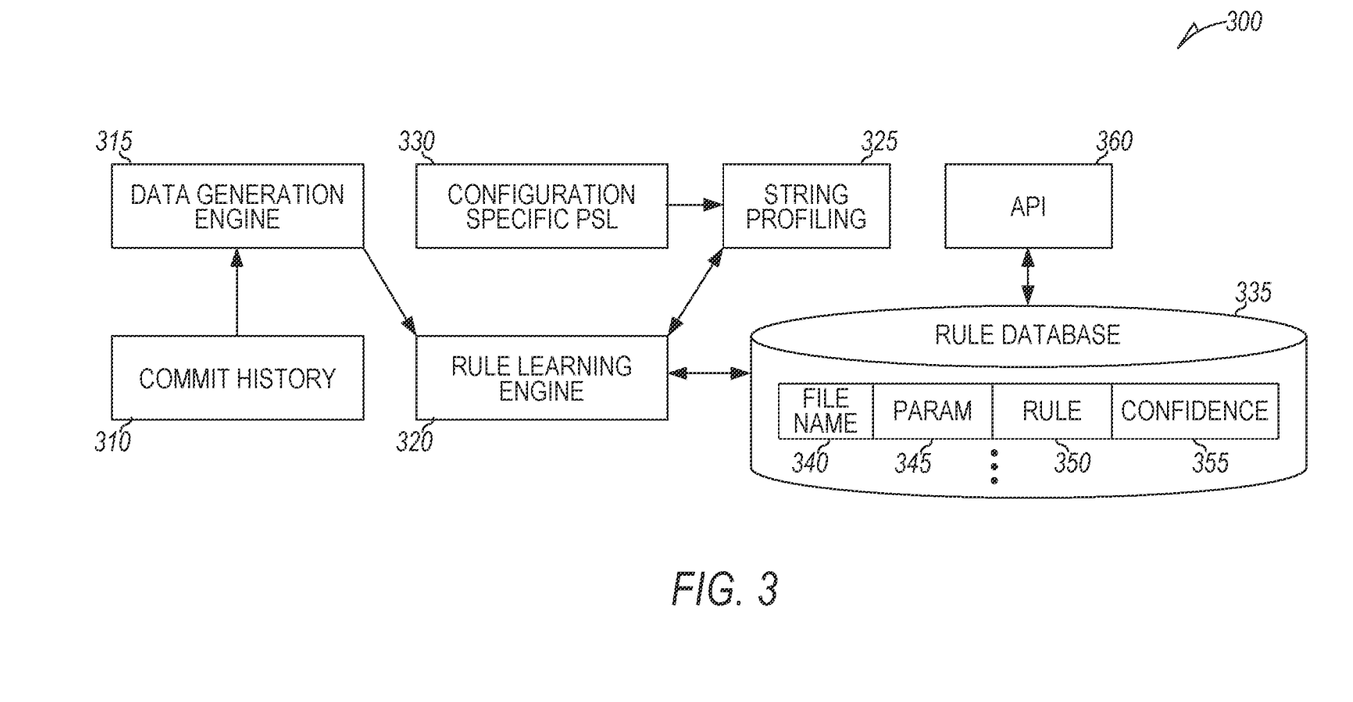
FIG. 3 is a detailed block diagram of one embodiment of a configuration miner, its components, and how the components interact according to an example embodiment.

FIG. 3 is a detailed block diagram of one embodiment of a configuration miner 300, its components, and how the components interact. A dataset of commit histories 310 for a particular system may contain up to 1000 or more configurations that have been committed. In other words, the configurations are believed to be valid, having been committed.

A data generation engine 315 is used to mine the history 310 and generate specific strings for use by a rule learning engine 320. The strings may be of varying lengths and may be randomly selected in one embodiment. In further embodiments, a percentage of, or all possible strings may be generated iteratively. Rule learning engine 320 may utilize any pattern matching software, such as machine learning based pattern matching, or string profiling 325. String profiling 325 may utilize a configuration specific domain specific language (DSL) based on the type of system and set of services being configured. A new string profiling algorithm may be used as described in further detail below.

Rule learning engine 320 provides the learned rules to a rule database 335, which stores the rules. The rules may be stored in a format that includes a file name 340, parameter 345, rule 350, and confidence 355. Confidence 355 may also include support for the corresponding rule. An application programming interface API 360 may be made available to one or more application for applying the rules to parameter values.

String proofing 325 executes an improved string profiling algorithm. Characterizing all the values a configuration parameter may take can be problematic. Given the known set $S$ of string values for a configuration parameter, a string profiling problem is to produce a set of disjoint regular expressions $\mathcal{R}$ (the output) and a set of outliers $\mathcal{O} \subseteq S$ such that $\forall s \in S. \ s \in \mathcal{O} \lor \exists r \in \mathcal{R} . \ s \in r$. Here, the notation $s \in r$ is used to represent that a strings matches a regular expression r. Note that ".s" means smallest s.

The set of regular expressions $\mathcal{R}$ is called the profile of $S$. Intuitively, each $r \in \mathcal{R}$ defines a cluster of similar strings in $S$. We will use the set of known values (obtained from the file or the history) for a configuration parameter to learn a profile $\mathcal{R}$ and use the profile as a specification for any new values of the configuration parameter.

The correctness requirements of the string profiling problem are rather easy to satisfy. The profile consisting the single regular expression. *, i.e., the expression to match all strings, is always a valid solution. To obtain useful solutions, an optimality criterion is defined. Intuitively, an optimal profile is one such that $\Sigma_{r \in \mathcal{R}}$ Score(r) is minimized, where Score is a custom defined ranking function.

The function Score assigns scores based on two factors: specificity and simplicity. For example, regular expressions that use the character class, i.e., class that matches all characters are given a high score, while expressions using long constant strings are given a lower score. On the other hand, the expression [0-9] * would be given a lower score than [0-9]{2, 3} despite the latter being more specific; the former is a simpler pattern.

Formally, the Score function acts recursively based on the structure of the regular expression. Any regular expression is composed of combinations of character classes with the concatenation, Kleene star, and bounded repetition. For example, the regular expression [a-z]*[0-9]{2,3} is a concatenation of the regular expressions [a-z]* and [0-9]{2,3}. The expression [a-z]* is given by applying Kleene star to the character class [a-z] and [0-9]{2,3} is given by bounded repetition of the character class [0-9].

For each character class, the score assigned as a constant c plus the square root of the size of the character class. In our implementation, we use c=5. For example, [a-z] has a size of 26 (i.e., it can match one of 26 characters). Hence, its score is given by 5+square root of 26, or approximately 10.1. Similarly, score of [0-9] is given by 5 plus square root of 10, or approximately 8.16.

Then, for any other regular expression r, if:
(a) r is a Kleene star. i.e., $r=r_1^*$, for some $r_1$, then Score(r)=Score($r_1$). For our example, Score([a-z]*)=10.1 as Score([a-z])=10.1.
(b) $r=r_1\{k_1,k_2\}$, then Score(r)=Score($r_1$)*(1+1/($k_1$+$k_2$+1)). For [0-9]{2,3}, Score([0-9]{2,3})=Score([0-9])*(1+1/(2+3+1)), i.e., Score([0-9]{2,3})=(8.16*(1+1/(2+3+1)))=9.52.
(c) r is a concatenation, i.e., $r=r_1 r_2$ for some $r_1$ and $r_2$, then the Score(r)=Score($r_1$)+ Score($r_2$). Now. Score([a-z]*[0-9]{2,3})=Score([a-z]*)+Score([0-9]{2,3})=8.16+9.52=17.68.

The optimality criterion is extended to a noisy setting as: $\Sigma_{r \in \mathcal{R}}$ Score(r)+o·|$\mathcal{O}$| where o∈$\mathbb{R}^+$ is the outlier penalty. Outliers are explicitly penalize using the parameter o, and tuning the value of o to control the balance between patterns and outliers. In our implementation, we found that values of parameter o between 5 and 10 produced good results.

In one example A, of string profiling 325, the following set of values that the ResourcePath configuration parameter takes are considered:

```
S = {
    "resource/2020-08-26/first.xml",
    "resource/2001-11-05/second.xml",
    ...,
    "resource/1992-03-15/third.xml",
    "deployed/main.xml",
    "deployed/secondary.xml",
    ...,
    "deployed/tertiary.xml",
    "test_resource.xml"
}
```

Here, the ResourcePath configuration values in this example fall into the following categories: (a) Values that match the regular expression $r_1$=resource/[0-9]{4}-[0-9]{2}-[0-9]{2}/[a-zA-Z]*[.]xml, (b) Values that match the regular expression $r_2$=deployed/[a-zA-Z]*[.]xml, and (c) the outlier value test_resource.xml.

Ideally, a string profiling procedure will characterize the patterns in $S$ with the regular expressions $\mathcal{R}=\{r_1, r_2\}$ and the outlier set $\mathcal{O}=\{\text{text\_resource.xml}\}$. This profile would signify that any new values for the configuration parameter should match either $r_1$ or $r_2$.

Figure 4:
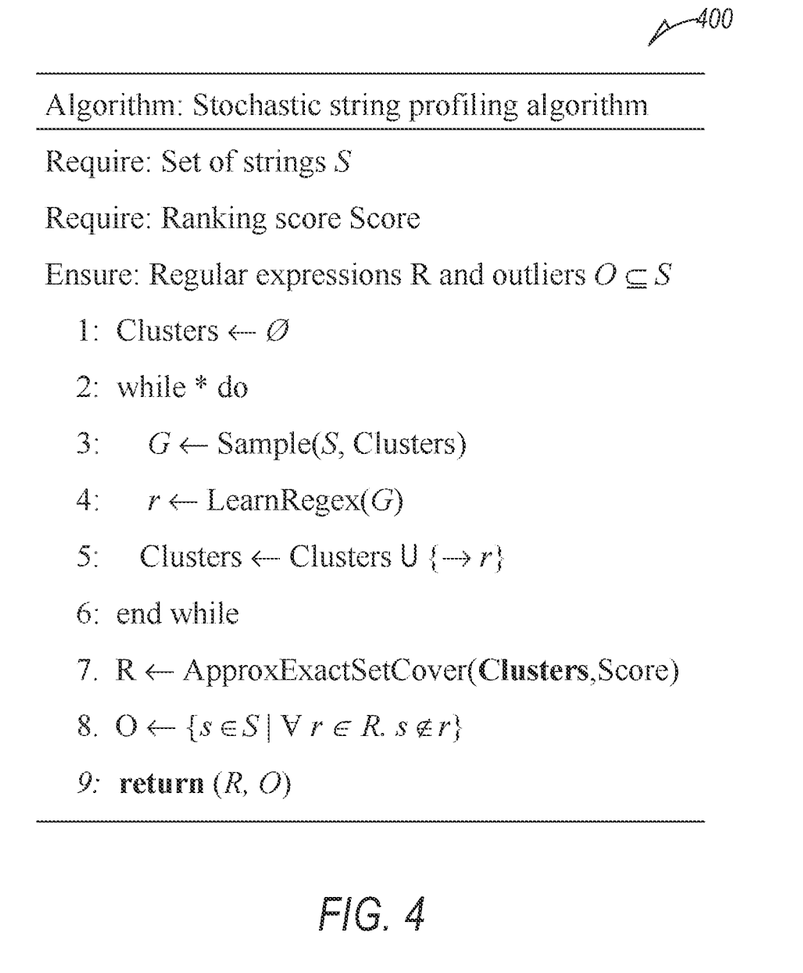
FIG. 4 is a representation of an algorithm solving a string profiling problem according to an example embodiment.

FIG. 4 is a representation of an algorithm 400 to implement for solving the string profiling problem. Algorithm 400 describes a stochastic algorithm for the string profiling problem. At its core, algorithm 400 uses the LearnRegex at line 4 to learn a single regular expression r from a set of sampled generators $G \subseteq S$. In general, the set G is small, between 2-5 strings. The LearnRegex procedure may be implemented in the Microsoft PROgram Synthesis using Examples SDK (PROSE).

Given a set of strings S Algorithm 400 maintains a dictionary Clusters that maps subsets G of S to the regular expression r=LearnRegex(G). Each item G↦r in Clusters is a potential cluster in the learned profile, representing the strings $\{s \in S | s \in r\}$. The procedure proceeds through the following stages:

Generate repeatedly samples small subsets (size 2-4) of S at line 3 and learn a regular expression using the LearnRegex procedure at line 4. During the sampling process, G is not constructed by uniformly sampling from S. Instead, G may be obtained as follows: Start with an empty G and extend G with one of the following randomly chosen options between 2 and 4 times:

String s where $s \in S$ does not belong to any cluster in Clusters,

All the generators G of a cluster G↦r in Clusters, and

String s where $s \in S$ does belong to a cluster in Clusters.

This biased sampling attempts to achieve one of the following: (a) construct a new cluster out of the strings that do not belong to any cluster, (b) merge or extend existing clusters to form a larger one, and (c) construct new clusters independently of existing ones. Ideally, the sample-and-learn loop is run until all patterns in the desired profile are added to the Clusters collection. However, since one does not initially know the desired patterns, in practice, sampling is performed until no new regular expressions have been added to Clusters for a selected number of iterations, such as 10. Such number of iterations may be varied in further embodiments, such as between 5 and 20 or higher depending on available computing resources.

Given a set of candidate clusters and the Score function, a select algorithm is used for the minimal exact set cover to pick a near optimal subset of clusters. Given a set X and a set of its subsets $Y=\{X_1, \ldots, X_n\}$ with a cost function mapping $X_i$ to reals, the exact set cover problem asks to choose a subset of $Y' \subseteq Y$ such that each $X_i, X_j \in Y'$ are disjoint and $U_{X_i \in Y'} X_i = X$. Of all such possible Y' the one with the minimal total cost may be selected. In one setting, (a) X is the set of all strings S, (b) Y contains the set of candidate clusters, and (c) the cost function is Score.

An approximation algorithm works in the standard greedy set cover algorithms, maintaining a partial solution and a set of regular expressions $\{r_1, r_2, \ldots, r_k\}$. In each iteration, the cluster G↦r which maximizes $|\{s \in S | s \in r \land \forall i. s \notin r_i\}|/\text{Score}(r)$ is added to the partial solution, and all clusters which intersect with $r_i$, are discarded from Clusters.

However, rather than proceeding until all strings in S are covered in the solution, the algorithm stops adding to the partial solution when the value $|\{s \in S | s \in r \land \forall i. s \notin r_i\}|/\text{Score}(r)$ drops below an outlier penalty $o^{-1}$ for all r in Clusters. The strings in S that are not matched by any $r_i$ in the solution are deemed outliers $\mathcal{O}$. The string profiling algorithm thus generates a set of outliers. The number of outliers generated in the set of outliers is controlled by the outlier penalty parameter. In one embodiment, the procedure implementing the algorithm additionally returns the confidence and support for each pattern in the profile, which are defined as the fraction and the number of strings in S, respectively, that are matched by the corresponding regular expression.

It should be noted here that the fact that the procedure ignores a small fraction of outliers ensures that any rare examples of that configuration parameter which might be misconfigurations are not used in the learning process.

In Example B, consider the set of strings S from Example A. In the first phase of the algorithm, subsets of S are sampled and regular expressions are learned from the samples. There are three separate cases:

(a) The sample only contains strings of form "resource/{date}/{file_name}.xml (respectively, deployed/{file_name}.xml). In this case, LearnRegex returns $r_1$ (respectively, $r_2$).

(b) Sample contains strings of both forms. Here, $r_3$=[a-zA-Z/]+/[a-zA-Z]*[.]xml is returned.

(c) The sample contains the outlier string test\_resource.xml. Here, $r_4$=[a-zA-Z/_]*[.]xml is returned.

By design, the ranking score function produces scores with $\text{Score}(r_1), \text{Score}(r_2) < \text{Score}(r_3) < \text{Score}(r_4)$, by the principle of specificity.

During the second phase, selection, the clusters are chosen using the greed heuristic, with $r_1$ and $r_2$ picked in sequence. For the rest of the clusters, the normalized score is less than the outlier penalty $o^{-1}$. Hence, the string test_resource.xml is deemed an outlier. Note that the selection of regular expressions depends heavily on the Score function. With different Score functions, there are cases where the preferred cluster may be $r_3$ or $r_4$.

String profiling 325 provides improved performance that can be attributed to avoiding expensive agglomerative hierarchical clustering (AHC) based approximation, which is $O(n^2)$ in the number of input strings. The time taken by string profiling 325 is dominated by the sample phase. The number of sampling iterations to produce good profiles depends on the number of patterns in the desired profile as opposed to the number of input strings, and is often more efficient than prior string selection algorithm AHC.

Further, string profiling 325 often produces profiles of a higher quality than prior string profiling algorithms. In the string profiling setting, AHC is sensitive to incorrect decisions in a manner that is not possible for numerical data. Prior string selection algorithm AHC proceeds by initially considering each string to be a cluster by itself, and then iteratively merging the two clusters that are the closest to each other. In string profiling 325, the notion of distance is given by the Score value of the regular expression generated by the strings in the cluster. One incorrect merging decision, often due to outliers or similar strings of different patterns, has a cascading effect and may produce undesirable profiles.

A further example C includes a set of strings representing dates of the forms "14 Jan. 2020" and "23 Feb. 2020". Say the data contained the strings "3 May 1992" and "3 May 1992". It is possible and likely that the first merge performed by prior string selection algorithm AHC will group these strings as the resulting regular expression 03[-]May[-]1992 is very specific and will have a low Score value.

After this point, all subsequent clusters will have either include both these strings, or exclude both of them. Hence, we can never obtain the desired regular expressions [0-9]{2}-[A-Z][a-z]{2}-[0-9]{4} and [0-9]{2}[A-Z][a-z]*[0-9]{4}. Instead, prior string selection algorithm AHC returns a profile that has the single regular expression [0-9]{2}[-][A-Z][a-z]*[-][0-9]{4} which mixes the two separate formats.

Similarly, in the presence of outliers, one incorrect decision merging an outlier with a non-outlier cluster will cause significant degradation of the final results. String profiling 325 avoids these issues—even if the sampling groups strings incorrectly, the clusters that arise from these groups will be safely ignored during the selection phase.

For domain specific configuration mining, a PROSE SDK implementation of the LearnRegex procedure (see line 4 in FIG. 4) may be used. However, this procedure was customized to the context of configuration mining. During the learning process, LearnRegex constructs regular expressions using a domain specific language DSL 330 of generic tokens such as [0-9] for digits and [A-Z] for uppercase letters. The DSL was modified to make it more configuration-specific. Consider the following example scenarios.

Configurations often capture names, such as file names, test names and firewall rule names. Names can have an arbitrary number of camel-cased terms. Camel cased terms are phrases without spaces or punctuation, indicating the separation of words with a single capitalized letter, and the first word starting with either case. For instance, a parameter testname captures the names of tests to run on a particular code-base. Say three unique values were found for such names of tests: ("testComponent","testData","testSystem"). Given the generic DSL, rule learning engine 320 would learn the regular expression test[A-Z][a-z]+ which allows only one camel-cased term to follow test. Hence if an application queries ConfMiner with the value "testAppData" for this parameter, the regular expression will not match it since it has two camel-cased terms following test. To accommodate this scenario, the configuration-specific DSL 330 ignores the token [A-Z] and hence rule learning engine 320 learns the regular expression test[A-Za-z]+ which is much more general and allows an arbitrary number of camel-cased terms in the name.

The configuration-specific DSL 330 also includes new tokens. For instance, values often capture lists of arbitrary sizes where a delimiter such as a comma separates the list elements. To allow for lists of arbitrary size, the configuration-specific DSL 330 includes tokens such as (\w+,)+ which covers comma-separated lists or arbitrary size. If the DSL 330 does not include such list-specific patterns, ConfMiner learns regular expressions only towards a specific number of elements in the list which again causes incorrect matching behavior in a large number of cases.

Data generation engine 315 generates data for file-based and history-based rules generation from the commit history 310. Data generation engine 315 may be triggered to learn file-based rules is triggered every time a configuration file is changed. The data generation engine 315 parses the configuration file using format-specific parsers. Currently, eleven different file types including xml, json, yaml and ini are supported. Further file types may be supported in further embodiments. Each parser provides a tree object that captures all the configuration in a structured format. From this, tuples are extracted of the form (file_name 340, param_name 345, list_of_values). A parameter name, such as expiration 110, can exist under different parent configurations.

In one embodiment, the ancestry of each parameter is ignored completely and, as long as their names are identical, all values of parameters are combined within the same tuple and into one list of values. Hence, for the mentioned example, the tuple (app.yaml, expiration, ["0 s", "5 s", "5 m", "10 m" ]) is generated. This increases the number of values obtained for each parameter name and more data allows for rules with higher confidence and support from the string profiling algorithm.

Data generation for history-based rules is triggered every time a commit changes an existing parameter in a configuration file. For every file commit, a differential analysis is run on the file to detect which particular configuration parameter has changed. A textual difference (which version control systems readily provide) does not suffice because it is possible that the value of a parameter spans multiple lines, and if only some of those lines are changed, one cannot tell what the changed parameter is. The difference is performed at a syntactic level. To do this, configuration parsers are used to learn the tree object for the old version of the file and the same is done for the new version of the file. The versions are compared using heuristic approaches. From these comparisons, the changed configuration parameter and the new value it is set to is found. From this, tuples of the form file_name, param_name, list_of_values) are created by data generation engine 315.

In addition, new tuples that combine data across files are generated if the configuration parameter name (param_name) is the same. This aggregated data is particularly useful towards learning rules that govern generic datatypes such as IP addresses, and DLL version numbers which could have the same format across different files.

Depending on file format, configurations could have slightly varying structure. For instance, in the xml format, a configuration parameter, apart from having a value, could have attributes which themselves have set values. ConfMiner accommodates all these specific details for different formats.

Once data generation engine 315 generates data for file-based and history-based rules separately, the string profiling 325 algorithm is used to return a list of regular expressions with the confidence and support for each. While rules with higher confidence and support are indicative of "well-behaved" values of a configuration parameter, rules with very low confidence or support may be equally important and useful.

At first glance, this appears counter-intuitive. But several configuration parameters, in reality, have very varied patterns like the url parameter 130, 135, 140, 145. Learning one regular expression that captures all these parameters would make the regular expression too generic, albeit with high confidence and support. It may be better to learn a small number of regular expressions that capture the whole set of values, with each regular expression having relatively low confidence and support. The Score parameter is used in the string profiling 325 algorithm to strike this balance and set a very low threshold on the confidence and support of the rules learned.

Rule-learning engine 320 is triggered periodically, for example once a day. Using all commits made within that day, engine 320 learns history-based rules using a commit history of 6 months for example. Engine 320 learns file-based rules for any configuration file that has been changed on that day. Finally, all learned rules are stored in rule database 335, indexed by file name and/or parameter name.

API 360 may support a primary call of FindMatches (file_name, param_name, value). The call returns a list of all file-based and history-based rules that the value matches along with the confidence 355 and support for each rule 350. An application using the call can then further filter the learned rules based on its own confidence and support requirements. If no matching rule is found, a null value may be returned. Matches using generic history-based rules, which hold across different file names, may also be returned. Again, the application can decide to keep these rules or eliminate them.

In one embodiment, code to implement system 300 may include C #code and works with Git. The data generation engine 315 may be configured to interface with both Github and Azure DevOps. 11 file types that typically store configuration are supported, including xml, json, yaml, csproj, config and ini. For each format, the data generation engine 315 implements parsers which first translate the file contents into the xml format. The xml is input for the old version and the new version to a difference module which implements the differential syntactic analysis required to learn history-based rules. The difference module may be built using the XmlDiffAndPatch library. The API 360 may be implemented using approximately 1500 lines of C #code. Service hooks may be used to capture commits to configuration files as and when they happen.

Figure 5:
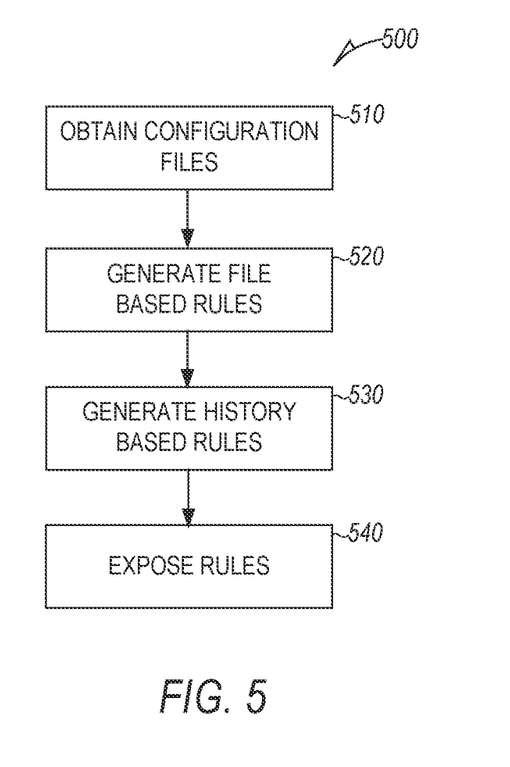
FIG. 5 is a flowchart illustrating a computer implemented method of generating configuration rules according to an example embodiment.

FIG. 5 is a flowchart illustrating a computer implemented method 500 of generating configuration rules. Method 500 begins by obtaining multiple configuration files that include configuration commit histories at operation 510. At operation 520, patterns in the configuration files are detected to generate file-based rules for configuration parameters. At operation 530 patterns in the configuration files are detected to generate history-based rules using commit histories for the configuration parameters. The rules may be exposed via an application program interface that accepts calls to find matches based on values and returns a list of rules that match the values along with a confidence and support for each rule.

In one embodiment, detecting patterns is performed by executing a string profiling algorithm on a set of strings for each configuration parameter. The string profiling algorithm generates a set of regular expressions that match strings of the set of strings. Regular expressions of the set of regular expressions are scored based on expression specificity and simplicity. In one embodiment, each expression of the set of regular expressions includes confidence and support values.

The string profiling algorithm may further generate a set of outliers. The scores may be a function of outliers in the set of outliers.

The regular expressions are generated from a sampled subset of strings of the set of strings. The sampled subset of strings may be biased as a function of clusters that maps a subset of strings to regular expressions.

In one embodiment, the sampled subset of strings is selected as a function of randomly selected options that include: selecting a string from the set of strings where the string does not belong to any cluster; selecting a string from the subset of strings in the clusters; and selecting a string from the set of strings where the string belongs to a cluster. Sampling may be stopped after a predetermined number of selections, such as 10 for example, yield no sample being selected.

Figure 6:
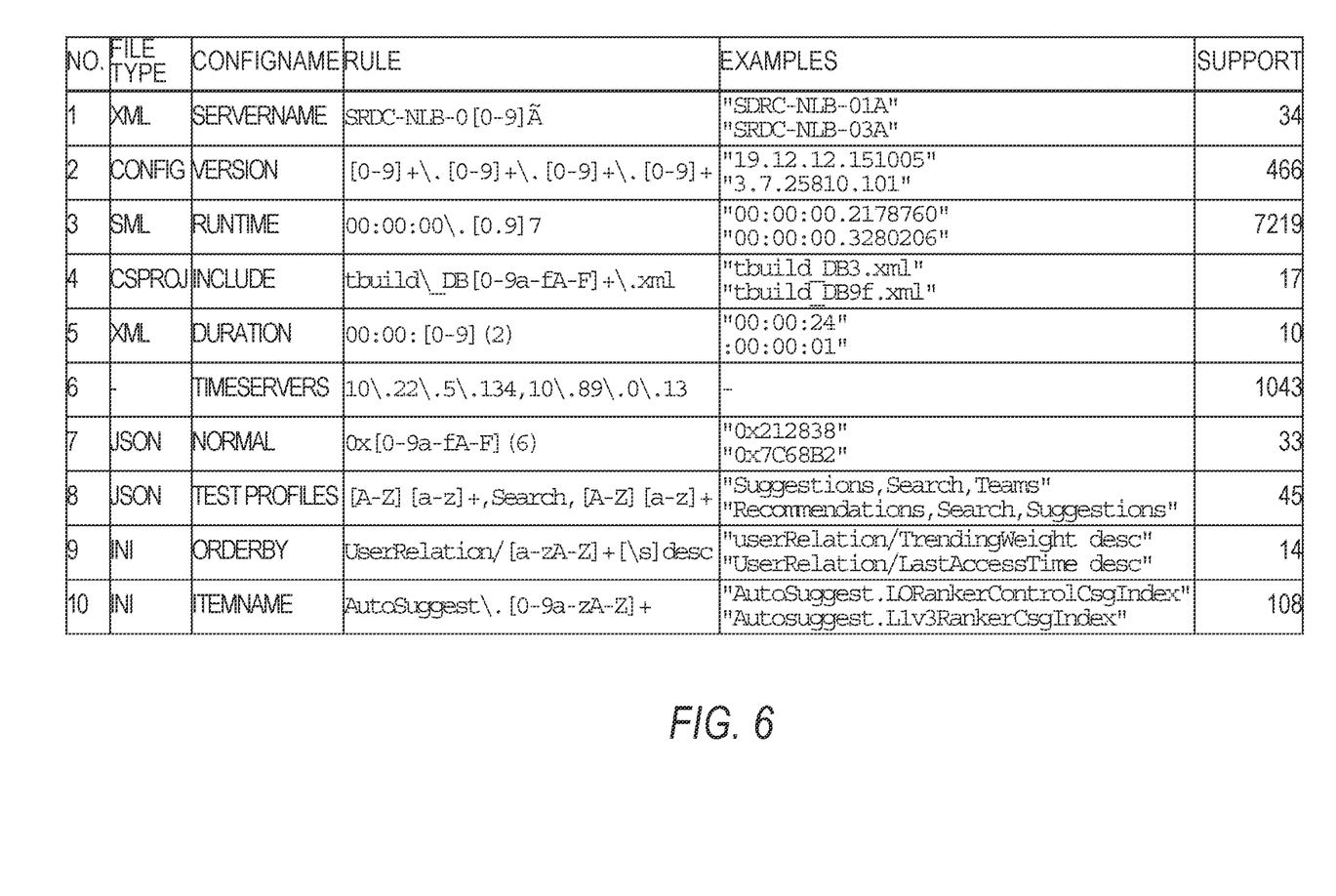
FIG. 6 is table of example rules learned in an example system deployment according to an example embodiment.

FIG. 6 is table of example rules learned in an example system deployment in which thousands of configuration files based on configuration commits has been stored. Both file-based and history-based methods learn similar rules. As can be seen the support i.e. the number of examples used to learn each rule can vary widely, sometimes reaching a few thousand. Also, the system learns many rules across all major configuration file types such as xml, json and csproj. Rules learned many different kinds of patterns. Row 1 shows how formats in machine names was learned. Row 2 demonstrates that version numbers in a particular configuration file consist of four numbers separated by a ".". Rows 3 and 5 capture two different time formats. Row 4 shows an example pattern in included file-names in a project file. Row 6 is an example of an aggregated history-based rule across many files. Two very specific IP addresses were learned. Row 7 infers a 7-digit hexadecimal pattern. Row 8 learns a list of strings with a specific pattern, i.e. the word "Search" is always second in the list. Finally Row 9 and row 10 show miscellaneous examples of configuration value patterns that specify an ordering relationship and an autosuggest algorithm respectively.

As these examples show, patterns of very different types exist across various configuration values that have a wide array of semantics. Using a generic program synthesis framework enables the system to be relevant in a large number of scenarios which are very different from each other.

In attempts to configure systems, configuration values that hold file names and file paths are often misconfigured with relative paths rather than absolute paths.

High-level misconfigurations which do not manifest at the syntactic level may also be identified. In one example configuration file, at line 943, the developer may change a value for BootstrapTimeStamp from 1.00:00:00 to 24.00:00:00. However, in multiple other sections of the file, for instance in line 918, the same configuration has been set to a value of 2.00:00:00. A file-based rule therefore learned that this configuration should be set such that the first number that appears is a single digit, and not two digits, as in 24. This is a high-level semantic error that has been identified.

Several style-related recommendations may also be made. A specific file format: a string-based name, followed by a hyphen and a date may be learned. If an underscore instead of a hyphen is used, the call return may flag such a commit. Automating such flagging of format issues can greatly improve readability and hygiene for configuration.

Figure 7:
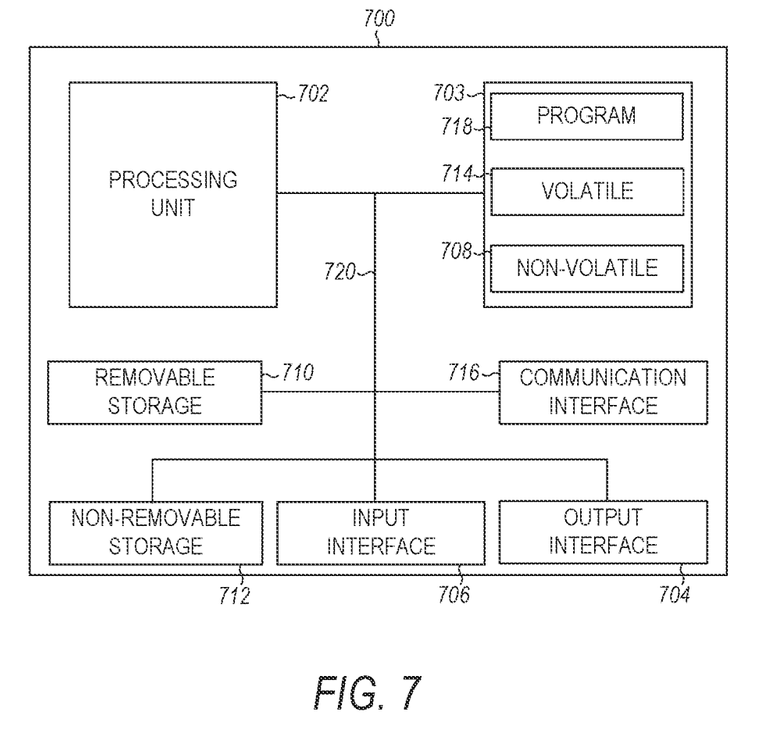
FIG. 7 is a block schematic diagram of a computer system to implement one or more example embodiments.

FIG. 7 is a block schematic diagram of a computer system 700 for executing programs to generate configuration rules, exposed the rules via an API, and for performing methods and algorithms according to example embodiments. All components need not be used in various embodiments.

One example computing device in the form of a computer 700 may include a processing unit 702, memory 703, removable storage 710, and non-removable storage 712. Although the example computing device is illustrated and described as computer 700, the computing device may be in different forms in different embodiments. For example, the computing device may instead be a smartphone, a tablet, smartwatch, smart storage device (SSD), or other computing device including the same or similar elements as illustrated and described with regard to FIG. 7. Devices, such as smartphones, tablets, and smartwatches, are generally collectively referred to as mobile devices or user equipment.

Although the various data storage elements are illustrated as part of the computer 700, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 703 may include volatile memory 714 and non-volatile memory 708. Computer 700 may include—or have access to a computing environment that includes—a variety of computer-readable media, such as volatile memory 714 and non-volatile memory 708, removable storage 710 and non-removable storage 712. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 700 may include or have access to a computing environment that includes input interface 706, output interface 704, and a communication interface 716. Output interface 704 may include a display device, such as a touchscreen, that also may serve as an input device. The input interface 706 may include one or more of a touchscreen, touchpad, mouse, keyboard, camera, one or more device-specific buttons, one or more sensors integrated within or coupled via wired or wireless data connections to the computer 700, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 700 are connected with a system bus 720.

Computer-readable instructions stored on a computer-readable medium are executable by the processing unit 702 of the computer 700, such as a program 718. The program 718 in some embodiments comprises software to implement one or more methods described herein. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 718 along with the workspace manager 722 may be used to cause processing unit 702 to perform one or more methods or algorithms described herein.

EXAMPLES

1. A computer implemented method includes obtaining multiple configuration files that include configuration commit histories, detecting patterns in parameter values in the configuration files to generate file-based rules for configuration parameters, detecting patterns in parameter values in the configuration files to generate history-based rules using the configuration commit histories for the configuration parameters, and exposing the file-based rules and history-based rules to a calling program.

2. The computer implemented method of example 1 wherein detecting patterns comprises executing a string profiling algorithm on a set of strings for each configuration parameter.

3. The computer implemented method of example 2 wherein the string profiling algorithm generates a set of regular expressions that match strings of the set of strings.

4. The computer implemented method of example 3 and further comprising scoring regular expressions of the set of regular expressions based on expression specificity and simplicity.

5. The computer implemented method of example 4 wherein each expression of the set of regular expressions includes confidence and support values.

6. The computer implemented method of any of examples 4-5 wherein the string profiling algorithm further generates a set of outliers, and wherein the number of outliers generated in the set of outliers is controlled by an outlier penalty parameter.

7. The computer implemented method of any of examples 3-6 wherein the regular expressions are generated from a sampled subset of strings of the set of strings.

8. The computer implemented method of example 7 wherein the sampled subset of strings are biased as a function of clusters that maps a subset of strings to regular expressions.

9 The computer implemented method of example 8 wherein the sampled subset of strings is selected as a function of randomly selected options including selecting a string from the set of strings where the string does not belong to any cluster, selecting a string from the subset of strings in the clusters, and selecting a string from the set of strings where the string belongs to a cluster.

10. The computer implemented method of example 9 wherein sampling is stopped after a predetermined number of selections yield no sample being selected.

11. The computer implemented method of example 10 wherein the predetermined number of selections is 10.

12. The computer implemented method of any of examples 1-11 wherein the file-based rules and history-based rules are exposed via an application program interface that accepts calls to find matches based on values and returns a list of rules that match the values along with a confidence and support for each rule.

13. A machine-readable storage device has instructions for execution by a processor of a machine to cause the processor to perform operations to perform a method. The operations include obtaining multiple configuration files that include configuration commit histories, detecting patterns in parameter values in the configuration files to generate file-based rules for configuration parameters, detecting patterns in parameter values in the configuration files to generate history-based rules using commit histories for the configuration parameters, and exposing the file-based and history-based rules to calling programs.

14. The device of example 13 wherein detecting patterns comprises executing a string profiling algorithm on a set of strings for each configuration parameter, wherein the string profiling algorithm generates a set of regular expressions that match strings of the set of strings.

15. The device of example 14 and further comprising scoring regular expressions of the set of regular expressions based on expression specificity and simplicity.

16. The device of example 15 wherein the regular expressions are generated from a sampled subset of strings of the set of strings iteratively selected as a function of randomly selected options including selecting a string from the set of strings where the string does not belong to any cluster, selecting a string from the subset of strings in the clusters, and selecting a string from the set of strings where the string belongs to a cluster.

17. A device includes a processor and a memory device coupled to the processor and having a program stored thereon for execution by the processor to perform operations. The operations include obtaining multiple configuration files that include configuration commit histories, detecting patterns in parameter values in the configuration files to generate file-based rules for configuration parameters, detecting patterns in parameter values in the configuration files to generate history-based rules using commit histories for the configuration parameters, and exposing the file-based and history-based rules to calling programs.

18. The device of example 17 wherein detecting patterns comprises executing a string profiling algorithm on a set of strings for each configuration parameter, wherein the string profiling algorithm generates a set of regular expressions that match strings of the set of strings.

19. The device of example 18 and further comprising scoring regular expressions of the set of regular expressions based on expression specificity and simplicity.

20. The device of example 19 wherein the regular expressions are generated from a sampled subset of strings of the set of strings iteratively selected as a function of randomly selected options including selecting a string from the set of strings where the string does not belong to any cluster, selecting a string from the subset of strings in the clusters, and selecting a string from the set of strings where the string belongs to a cluster.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
obtaining multiple configuration files that include configuration commit histories;
detecting patterns in parameter values in the configuration files to generate file-based rules for configuration parameters;
detecting patterns in parameter values in the configuration files to generate history-based rules using the configuration commit histories for the configuration parameters by executing a string profiling algorithm on a set of strings for each configuration parameter, wherein the string profiling algorithm generates a set of regular expressions that match strings of the set of strings and scores regular expressions of the set of regular expressions based on expression specificity and simplicity; and
exposing the file-based rules and history-based rules to a calling program.

2. The computer implemented method of claim 1 wherein each expression of the set of regular expressions includes confidence and support values.

3. The computer implemented method of claim 1 wherein the string profiling algorithm further generates a set of outliers, and wherein the number of outliers generated in the set of outliers is controlled by an outlier penalty parameter.

4. The computer implemented method of claim 1 wherein the regular expressions are generated from a sampled subset of strings of the set of strings.

5. The computer implemented method of claim 4 wherein the sampled subset of strings are biased as a function of clusters that maps a subset of strings to regular expressions.

6. The computer implemented method of claim 5 wherein the sampled subset of strings is selected as a function of randomly selected options comprising:
selecting a string from the set of strings where the string does not belong to any cluster;
selecting a string from the subset of strings in the clusters; and
selecting a string from the set of strings where the string belongs to a cluster.

7. The computer implemented method of claim 6 wherein sampling is stopped after a predetermined number of selections yield no sample being selected.

8. The computer implemented method of claim 7 wherein the predetermined number of selections is 10.

9. The computer implemented method of claim 1 wherein the file-based rules and history-based rules are exposed via an application program interface that accepts calls to find matches based on values and returns a list of rules that match the values along with a confidence and support for each rule.

10. A machine-readable non-transitory storage device having instructions for execution by a processor of a machine to cause the processor to perform operations to perform a method comprising:
obtaining multiple configuration files that include configuration commit histories;
detecting patterns in parameter values in the configuration files to generate file-based rules for configuration parameters;
detecting patterns in parameter values in the configuration files to generate history-based rules using commit histories for the configuration parameters; and
exposing the file-based and history-based rules to calling programs.

11. The device of claim 10 wherein the regular expressions are generated from a sampled subset of strings of the set of strings iteratively selected as a function of randomly selected options including:
selecting a string from the set of strings where the string does not belong to any cluster;
selecting a string from the subset of strings in the clusters; and
selecting a string from the set of strings where the string belongs to a cluster.

12. A device comprising:
a processor; and
a memory device coupled to the processor and having a program stored thereon for execution by the processor to perform operations to perform a method comprising:
obtaining multiple configuration files that include configuration commit histories;
detecting patterns in parameter values in the configuration files to generate file-based rules for configuration parameters;

detecting patterns in parameter values in the configuration files to generate history-based rules using commit histories for the configuration parameters by executing a string profiling algorithm on a set of strings for each configuration parameter, wherein the string profiling algorithm generates a set of regular expressions that match strings of the set of strings and scores regular expressions of the set of regular expressions based on expression specificity and simplicity; and exposing the file-based and history-based rules to calling programs.

13. The device of claim 12 wherein the regular expressions are generated from a sampled subset of strings of the set of strings iteratively selected as a function of randomly selected options including:

selecting a string from the set of strings where the string does not belong to any cluster, selecting a string from the subset of strings in the clusters; and selecting a string from the set of strings where the string belongs to a cluster.

\* \* \* \* \*